United States Patent
Morikawa et al.

(10) Patent No.: US 6,762,147 B2
(45) Date of Patent: Jul. 13, 2004

(54) COMPOSITE OXIDE POWDER, CATALYST AND PROCESS FOR PRODUCING THE SAME

(75) Inventors: Akira Morikawa, Aichi-gun (JP); Takao Tani, Aichi-gun (JP); Miho Hatanaka, Aichi-gun (JP); Akihiko Suda, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 169 days.

(21) Appl. No.: 10/079,872

(22) Filed: Feb. 22, 2002

(65) Prior Publication Data

US 2002/0160912 A1 Oct. 31, 2002

(30) Foreign Application Priority Data

Feb. 23, 2001 (JP) .................................... 2001-047934

(51) Int. Cl.$^7$ ................................................ B01J 21/08
(52) U.S. Cl. ..................... 502/242; 423/593; 423/598; 423/592.1; 423/600; 501/103; 501/127; 501/134; 502/302; 502/304; 502/349; 502/355
(58) Field of Search ................................ 501/103, 127, 501/134; 502/242, 302, 304, 349, 385; 423/593, 598, 592.1, 600

(56) References Cited

U.S. PATENT DOCUMENTS

| | | | |
|---|---|---|---|
| 4,510,261 A | | 4/1985 | Pereira |
| 5,958,361 A | * | 9/1999 | Laine et al. ................ 423/610 |
| 5,993,762 A | * | 11/1999 | Rajaram et al. .......... 423/213.2 |
| 5,998,329 A | * | 12/1999 | Derolf et al. ............... 502/407 |
| 6,150,288 A | * | 11/2000 | Suzuki et al. ............... 501/105 |
| 6,288,273 B1 | * | 9/2001 | Heidemann et al. ........ 562/542 |
| 6,306,794 B1 | * | 10/2001 | Suzuki et al. ............... 502/304 |
| 6,335,305 B1 | * | 1/2002 | Suzuki et al. ............... 502/325 |
| 6,391,276 B1 | * | 5/2002 | Suda et al. .................. 423/598 |
| 6,528,029 B1 | * | 3/2003 | Dettling et al. ............. 423/210 |
| 6,528,451 B2 | * | 3/2003 | Brezny et al. .............. 502/304 |
| 6,534,438 B1 | * | 3/2003 | Baker et al. ................ 502/325 |
| 6,605,565 B1 | * | 8/2003 | Zhang et al. ............... 502/304 |

FOREIGN PATENT DOCUMENTS

| | | |
|---|---|---|
| EP | 0141998 | 1/1984 |
| JP | 4-292480 | 10/1992 |
| JP | 2893648 | 3/1999 |

OTHER PUBLICATIONS

U.S. 2002/0160912 A1 10/079,872 Morikawa et al Oct. 31, 2002.*

* cited by examiner

*Primary Examiner*—Steven Bos
*Assistant Examiner*—William G. Wright, Sr.
(74) *Attorney, Agent, or Firm*—Oblon, Spivak, McClelland, Maier & Neustadt, P.C.

(57) ABSTRACT

Composite oxide powder has a large specific surface area and a large pore volume even after a high-temperature durability test, without losing oxygen storage ability of a single metal oxide. In this composite oxide powder, a first metal oxide having oxygen storage ability is held as ultrafine particles in the form of islands by a second metal oxide which is different from the first metal oxide, pore volume is not less than 2 cc/g and the first metal oxide particles have a diameter of not more than 30 nm even after subjected to high temperature of 900° C. or more. Since the first metal oxide particles are held in the form of islands by the second metal oxide particles, separated from each other and suppressed from contacting each other, the first metal oxide particles hardly grow granularly.

22 Claims, 4 Drawing Sheets

COMPOSITE OXIDE POWDER, CATALYST AND PROCESS FOR PRODUCING THE SAME

BACKGROUND OF THE INVENTION

1. Field of the Invention

This invention relates to composite oxide powder having oxygen storage ability and a process for producing the same, and a catalyst employing the composite oxide powder of this invention as a catalyst support and a process for producing the same. This catalyst can be used for hydrogen generation, exhaust gas purification, etc.

2. Description of the Related Art

As catalysts for purifying automotive exhaust gases, there have been employed 3-way catalysts so far which oxidize carbon monoxide (CO) and hydrocarbons (HC) and reduce nitrogen oxides (NO x) at the same time to purify exhaust gases. For example, 3-way catalysts are known widely which comprise a heat-resistant honeycomb-shaped supporting base material formed of cordierite, a catalyst support layer formed of $\gamma\text{-}Al_2O_3$ and disposed on the supporting base material, and a noble metal such as platinum (Pt) and rhodium (Rh) loaded on the catalyst support layer.

Catalyst supports used for catalysts for purifying exhaust gases are required to have a large specific surface area and a high heat resistance, and are generally composed of $Al_2O_3$, $SiO_2$, $ZrO_2$, $TiO_2$ or the like. In order to reduce variations in exhaust gas atmospheres, it is also known to add $CeO_2$, which has oxygen storage ability, or a $CeO_2\text{-}ZrO_2$ solid solution, which has improved oxygen storage ability and heat resistance of $CeO_2$.

By the way, owing to the recent severe regulations on exhaust gases, there is an extremely strong need to purify exhaust gases even in a very short time from an engine start. To meet these regulations, it is necessary to activate a catalyst to purify regulated exhaust gas components at lower temperatures. Particularly, a catalyst formed by loading Pt, etc. on $CeO_2$ has a superior ability of converting CO from a low temperature. By using this type of catalysts in combination, CO is ignited at a low temperature and CO adsorption poisoning of Pt is lessened and HC ignitability improves. Also by using this type of catalysts in combination and igniting CO at a low temperature, warming of catalyst surfaces is promoted, whereby HC can be converted from a low temperature range. Besides, when this type of catalysts are employed in combination, $H_2$ is generated in a low temperature range by water gas shift reaction and the generated $H_2$ can be used as a reducing agent for a reaction with $NO_x$, whereby $NO_x$ can be reduced and purified from a low temperature range.

However, the conventional catalyst comprising $CeO_2$ and a noble metal loaded thereon is poor in durability in actual exhaust gases, so $CeO_2$ is sintered by heat and its oxygen storage ability deteriorates. The noble metal loaded on $CeO_2$ grows granularly due to the sintering of $CeO_2$ and its catalytic activity deteriorates, so the conventional catalyst has a problem in practical use. Therefore, it is essential to improve heat resistance without damaging the oxygen storage ability of $CeO_2$ and to stabilize the noble metal on the catalyst support.

For example, Japanese Unexamined Patent Publication (KOKAI) No.H4-292480 discloses a composite catalyst support in which $CeO_2$ is contained in an $Al_2O_3$ matrix in a highly dispersed state. This composite catalyst support has a $CeO_2$ particle diameter of 2.5 to 6 nm after subjected to a thermal treatment at 350° C. for 4 hours, and a $CeO_2$ particle diameter of 15 to 35 nm after subjected to a thermal treatment at 1100° C. for 4 hours.

Japanese Patent No.2893648 discloses catalyst support raw materials composed of $Al_2O_3\text{-}CeO_2$ composite oxide prepared by a co-precipitation method. This catalyst support attains a $CeO_2$ particle diameter of not more than 9 nm even after calcination at 1000° C. for 2 hours.

In the case of a catalyst in which a noble metal is loaded on the composite catalyst support described in Japanese Unexamined Patent Publication No.H4-292480, however, when the $CeO_2$ particle diameter exceeds 15 nm, contact surface area of the noble metal and $CeO_2$ decreases and oxygen storage ability and noble metal grain growth suppression effect deteriorate. Therefore, the $CeO_2$ particle diameter after thermal treatment at 1100° C. is desirably not more than 15 nm.

Japanese Unexamined Patent Publication No.H4-292480 and Japanese Patent No.2893648 disclose that a catalyst support preferably has a pore volume of 0.15 to 0.5 cc/g. With this small pore volume, however, gas diffusion into the inside of the catalyst support is insufficient, which results in a low efficiency of using a catalyst metal loaded on the catalyst support as catalytic activity points.

SUMMARY OF THE INVENTION

The present invention has been conceived in view of the aforementioned circumstances. It is an object of the present invention to provide composite oxide powder having a large specific surface area and a large pore volume even after exposed to high temperature for a long time without losing oxygen storage ability of such a single metal oxide as $CeO_2$. It is another object of the present invention to provide a catalyst with excellent durability by suppressing noble metal grain growth when exposed to high temperature for a long time.

Composite oxide powder of the present invention, which attains the above objects, is characterized in that a first metal oxide having oxygen storage ability is held as ultrafine particles in the form of islands by a second metal oxide which is different from the first metal oxide; the composite oxide powder has a pore volume of not less than 2 cc/g; and the first metal oxide has a particle diameter of not more than 30 nm even after exposed to high temperature of 900° C. or more.

The first metal oxide is preferably at least one of $CeO_2$, $Pr_2O_3$, $Eu_2O_3$ and $Tb_2O_3$. The second metal oxide is preferably at least one of $Al_2O_3$, $SiO_2$, $TiO_2$, $SiO_2\text{-}Al_2O_3$ and $TiO_2\text{-}Al_2O_3$. It is desirable that the second metal oxide includes $Al_2O_3$, and more desirably is principally composed of $Al_2O_3$. It is also preferable that at least one of the first metal oxide and the second metal oxide further contains a third metal oxide which is at least one of $La_2O_3$, $Y_2O_3$ and $ZrO_2$.

The composite oxide powder of the present invention preferably has a shell shape, and desirably the shell shape is hollow. It is also desirable that the particles of the first metal oxide are exposed on the surface of a shell composed of the second metal oxide or the second metal oxide and the third metal oxide.

Moreover, it is preferable that the composite oxide powder has an outside particle diameter of 20 to 5000 nm, and it is desirable that the ratio of an inner hole diameter to an outside particle diameter is 0.5 to 0.99. The composite oxide powder desirably has a specific surface area of 20 $m^2/g$ or more.

A catalyst of the present invention is characterized in comprising a catalyst support composed of the composite oxide powder of the present invention and a catalyst metal loaded on the catalyst support.

A production process of the present invention, which is most suitable to produce the composite oxide powder of the present invention, is characterized in comprising the steps of preparing a W/O type emulsion by mixing an organic solvent and a dispersing agent in an aqueous solution in which a water-soluble compound of a first metal element whose oxide has oxygen storage ability and a water-soluble compound of a second metal element which is different from the first metal element are dissolved; and spraying and burning the W/O type emulsion, thereby obtaining composite oxide powder. Spraying and burning temperature is desirably in the range from 700 to 1200° C. It is also possible to apply a thermal treatment to the obtained composite oxide powder at 700 to 1200° C., after the spraying and burning.

The first metal element is preferably at least one of Ce, Pr, Eu and Tb, and the second metal element is preferably at least one of Al, Si and Ti. Moreover, it is particularly desirable that the second metal is principally composed of Al. It is also preferable that the aqueous solution further contains a water-soluble compound of a third metal element which is at least one of La, Y and Zr.

It is also possible that in the production process of the present invention a catalyst metal compound is further dissolved in the aqueous solution.

DETAILED DESCRIPTION OF THE INVENTION

The composite oxide powder of the present invention is characterized in that a first metal oxide having oxygen storage ability is held as ultrafine particles in the form of islands by a second metal oxide which is different from the first metal oxide; the composite oxide powder has a pore volume of not less than 2 cc/g; and the first metal oxide has a particle diameter of not more than 30 nm even after exposed to high temperature of 900° C. or more.

For example, such a first metal oxide having oxygen storage ability as $CeO_2$ and $Pr_2O_3$ generally has a low heat resistance and grows granularly around 900° C. In the composite oxide powder of the present invention, however, since the first metal oxide particles are held in the form of islands by the second metal oxide and are suppressed from being in contact with each other, the first metal oxide particles hardly grow granularly.

Therefore, in the catalyst of the present invention in which a catalyst metal is loaded on the composite oxide powder of the present invention, the catalyst metal loaded on the ultrafine first metal oxide particles has a lot of contact surface area with the first metal oxide even after a high-temperature durability test, and is suppressed from reacting with each other in a solid phase. So, the catalyst metal is suppressed from growing granularly. Besides, since the first metal oxide particles are suppressed from growing granularly, the first metal oxide particles exhibit a high oxygen storage ability and catalytic activity of the catalyst metal is also suppressed from deteriorating. Therefore, the catalyst of the present invention can exhibit high catalytic activity even after a high-temperature durability test.

In the composite oxide powder of the present invention, the first metal oxide can have a particle diameter of not more than 15 nm or not more than 10 nm even after exposed to high temperature of 900° C. or more, and can have a particle diameter of not more than 15 nm even after exposed to high temperature of 1000° C. or not less than 1100° C.

Therefore, since the first metal oxide particles are suppressed from growing granularly during a high-temperature durability test, the composite oxide powder of the present invention attains a high oxygen storage ability even after the high-temperature durability test without losing oxygen storage ability of a single metal oxide.

The composite oxide powder of the present invention has a great feature in the shape of a shell with a small shell thickness. Owing to the shell shape, a large primary particle diameter is compatible with a large specific surface area and a large pore volume of not less than 2 cc/g can be obtained. Therefore, gas diffusion is easy and contact probability of gas and catalyst metal is high, so the composite oxide powder of the present invention is particularly useful as a catalyst support. The pore volume is required to be not less than 2 cc/g. If the pore volume is less than 2 cc/g, gas diffusion ability decreases and catalytic activity of a catalyst using the composite oxide powder of the present invention deteriorates. The upper limit of the pore volume is not restricted in particular, but according to the production process of the present invention the maximum pore volume is about 4 to 5 cc/g. At the moment, it is difficult to attain a pore volume above this level.

Desirably the first metal oxide particles are exposed on the surface of a shell composed of the second metal oxide. In this case, the maximum oxygen storage ability can be exhibited. It is to be noted that for instance, even $Al_2O_3$, which has a high heat resistance, grows granularly and has a decrease in specific surface area at the temperature of about 1000° C. In the case of the composite oxide powder of the present invention, however, the shell composed of the second metal oxide has a relatively large particle diameter and a small contact area between the particles. Therefore, even if $Al_2O_3$ is employed as a second metal oxide, the specific surface area does not decrease around 1000° C.

The shell shape can be virtually the shape of seashells but more desirably be hollow. The production process of the present invention mentioned later can easily produce hollow composite oxide powder, and composite oxide powder in which first metal oxide particles are exposed on the surface of a shell composed of a second metal oxide. When the composite oxide powder is thus hollow, the composite oxide powder attains a much increased pore volume and can be more useful as a catalyst support.

The hollow composite oxide powder desirably has an outside particle diameter of 20 to 5000 nm and desirably has a ratio of an inner hole diameter to an outside particle diameter in the range from 0.5 to 0.99. Owing to this shape, the specific surface area can be 20 $m^2/g$ or more and the pore volume can be increased. Therefore, the hollow composite oxide powder is more useful as a catalyst support. Owing to the hollow shape, the composite oxide powder has a larger pore volume of a micro pore of about 1 $\mu$m than ordinary granular or acicular oxide powder. Consequently, when the hollow composite oxide powder is used as a catalyst support, gas diffusion into the catalyst support is very easy and this composite oxide powder exhibits a sufficient efficiency of converting such gases at high space velocity as automotive exhaust gases.

The first metal oxide can be at least one of $CeO_2$, $Pr_2O_3$, $Eu_2O_3$ and $Tb_2O_3$. Although all of these oxides have oxygen storage ability, $CeO_2$ is particularly desirable. The second metal oxide can be at least one of $Al_2O_3$, $SiO_2$, $TiO_2$, $SiO_2$—$Al_2O_3$ and $TiO_2$—$Al_2O_3$. It is desirable that the second metal oxide includes $Al_2O_3$ and that the second metal oxide is principally composed of $Al_2O_3$.

The second metal oxide in the composite oxide powder of the present invention is desirably amorphous. When the second metal oxide is amorphous, the first metal oxide particles can be easily exposed on the surface while being held by the second metal oxide. Therefore, the first metal oxide can exhibit the maximum oxygen storage ability. If $CeO_2$ is used as a first metal oxide and $Al_2O_3$ is used as a second metal oxide in this case, the composite oxide powder can exhibit this function and advantage easily and securely.

The compositional molar ratio of the first metal oxide to the second metal oxide is desirably in the range of first metal element: second metal element=8:2 to 0.5:9.5. When the ratio of the first metal oxide is smaller than this range, the oxygen storage ability is insufficient. On the other hand, when the ratio of the second metal oxide is smaller than this range, thermal stability decreases.

It is desirable that the composite oxide powder of the present invention further contains a third metal oxide which is at least one of $La_2O_3$, $Y_2O_3$, and $ZrO_2$. The inclusion of the third metal oxide further improves stability of the first metal oxide and/or the second metal oxide.

It is desirable that this third metal oxide together with the second metal oxide constitutes a shell and that the first metal oxide particles are held by this shell and at the same time exposed on the surface of this shell. Owing to this construction, thermal stability of the shell is improved and the first metal oxide particles are further suppressed from growing granularly. When the third metal oxide is $ZrO_2$, it is also possible to improve stability of the first metal oxide by forming a solid solution of $ZrO_2$ and the first metal oxide.

La or Y as a third metal element is contained preferably in the range of 0 to 3 mol % with respect to the total amount of the first metal element and the second metal element. Zr as a third metal element is contained preferably in the range of 0 to 50 mol % with respect to the total amount of the first metal element and the second metal element. When the amount of the third metal oxide is less than this range, the third metal oxide cannot exhibit a stabilization effect. On the other hand, when the amount of the third metal oxide is more than this range, the amount of the first metal oxide and/or the second metal oxide decreases relatively and as a result catalytic activity deteriorates.

A production process of the present invention, which can easily and securely produce the composite oxide powder of the present invention, comprises the steps of preparing a W/O type emulsion by mixing an organic solvent and a dispersing agent in an aqueous solution in which a water-soluble compound of a first metal element whose oxide has oxygen storage ability and a water-soluble compound of a second metal element which is different from the first metal element are dissolved; and spraying and burning the W/O type emulsion.

This method of spraying and burning the W/O type emulsion can form hollow composite oxide particles with a very small shell thickness. For instance, when Al is employed as a second metal element, this method can form hollow alumina particles with a primary particle diameter of 200 nm or more and a specific surface area of 20 m²/g or more. Though these causes are not clear at the moment, it is supposed that since aluminum ions have a high superficial oxide film forming rate, a superficial oxide film is formed on the surface of each waterdrop at an early stage of waterdrop contraction and, as a result, that hollow alumina particles with a very small shell thickness are prepared.

In this method of spraying and burning the emulsion, a diameter of each waterdrop (e.g., from several nanometers to several micrometers) in the emulsion or reversed micelle is the size of a reaction field, so temperature distribution in each waterdrop can be suppressed from generating during the combustion and more homogeneous amorphous oxide powder can be obtained. When there are a plurality of metal elements in one waterdrop, each metal element forms a nucleus separately but owing to a very short combustion time, each nucleus hardly grows and thus obtained are composite oxide particles in which ultrafine oxides exist together.

In the spraying and burning of the W/O type emulsion, the diameter of each waterdrop is the size of a reaction field as set forth above and combustion of oil around each waterdrop promotes water evaporation and oxides generation at the same time. The waterdrop diameter in the emulsion of less than 100 nm is not favorable because each waterdrop is contracted completely before a superficial oxide film is formed and the hollow shape cannot be obtained. On the other hand, the waterdrop diameter of more than 10 μm is not favorable either because the reaction field is so large that there arises a possibility that the resulting particles are heterogeneous. Accordingly, the waterdrop diameter in the emulsion is desirably controlled in the range of 100 nm to 10 μm.

The ratio of mixing the aqueous solution component and the organic solvent component in the emulsion is not limited in particular. However, when water exceeds 70% by volume, there is a possibility that the dispersed phase and the dispersing agent in the emulsion are reversed. Therefore in order to prepare a stable W/O type emulsion, water is desirably 70% by volume or less.

The temperature of spraying and burning the emulsion is desirably in the range from 600 to 1200° C. When the combustion temperature is less than 600° C., organic components are not completely burned and carbon components might remain in the formed composite oxide powder. On the other hand, when the combustion temperature exceeds 1200° C., there is a possibility that composite oxide particles coagulate together and that the specific surface area is lowered. It is desirable that the combustion temperature is set at 700 to 1200° C. or a thermal treatment is applied to the obtained composite oxide powder at 700 to 1200° C. after the spraying and burning. This contributes to stabilization of the surface of the composite oxide particles and suppression of grain growth caused by the fact that the particles are contacted with each other.

A combustion atmosphere of the emulsion is not limited in particular. However, when oxygen is insufficient, carbon components in the organic solvent might remain due to imperfect combustion. Therefore, it is desirable to burn the emulsion in an atmosphere containing a sufficient amount of oxygen to allow the organic solvent to be burned completely.

The first metal element is desirably at least one of Ce, Pr, Eu and Tb, and the second metal element is desirably at least one of Al, Si and Ti. The ratio of mixing the first metal element and the second metal element can be determined in accordance with the aforementioned compositional ratio of the first metal oxide and the second metal oxide. It is also desirable that the second metal element is principally composed of Al, and it is also preferable that the composite oxide composed of the first metal element and the second metal element further contains a third metal element which is at least one of La, Y and Zr. This reason is mentioned before. The amount of each metal element is equivalent to the aforementioned composition of the composite oxide powder of the present invention.

The water-soluble compound of the first metal element, the water-soluble compound of the second metal element, and the water-soluble compound of the third metal element are not limited in particular as long as they are soluble in water and can be, for instance, nitrates, acetates, sulfates, or chlorides.

The organic solvent can be any organic solvent which can form a W/O type emulsion together with the aforementioned aqueous solution. Examples of the organic solvent include hexane, octane, kerosene, and gasoline.

The kind and amount of the dispersing agent used in this invention is not limited in particular. It can be any of cationic surfactants, anionic surfactants and nonionic surfactants. The kind and amount of the dispersing agent added should be selected in accordance with the kinds of the aqueous solution and the organic solvent and the target diameter of each waterdrop.

This process of spraying and burning the emulsion can produce hollow composite oxide particles directly from a solution containing water-soluble compounds. Therefore this process does not require expensive alcoxide raw materials, which are required in a sol-gel process. Besides, this process does not require the steps of drying, calcination and pulverization, so composite oxide particles can be produced at low costs.

The catalyst of the present invention can be produced by using the composite oxide powder of the present invention as a catalyst support and loading a catalyst metal on the catalyst support. For example, a slurry principally composed of the composite oxide powder of the present invention is coated on a honeycomb-shaped monolithic substrate to form a coating layer and a catalyst metal is loaded on the coating layer by the loading-by-adsorption process, the loading-by-impregnation process, etc. It is also possible to form a coating layer from catalyst powder which is formed by loading a catalyst metal on the composite oxide powder of the present invention.

Typical examples of the catalyst metal include such noble metals as Pt, Rh, Pd, Ir and Ru, but in some cases a base metal can also be used alone or in combination with a noble metal. In a similar way to the conventional catalyst, the amount of the catalyst metal loaded is determined in accordance with the purpose or aim.

Catalyst metal-loaded composite oxide powder can be produced by preparing a W/O type emulsion by using an aqueous solution in which a catalyst metal compound is dissolved in addition to the first metal element, etc., and spraying and burning the emulsion. In this case, the combustion temperature at the time of spraying and burning the emulsion is preferably not more than 1000° C., and more preferably from 700 to 900° C. When the combustion temperature exceeds 900° C., part of products grow granularly to form crystalline powder, which results in poor specific surface area, and the same time the heat causes grain growth of the noble metal, which results in poor catalytic activity.

Now, advantages of the present invention will be described.

The composite oxide powder of the present invention has a high pore volume even after a high-temperature durability test and the first metal oxide particles are suppressed from growing granularly. Therefore in a catalyst comprising this composite oxide powder and a noble metal loaded thereon, the noble metal is suppressed from growing granularly even after a high-temperature durability test and maintained in a highly dispersed state and exhaust gases can easily reach activity points. So, the catalyst exhibits high catalytic activities. The catalyst of the present invention can maintain high CO conversion efficiency at low temperatures, which is the merit of the noble metal-loaded first metal oxide, even after a high-temperature durability test, and can maintain high HC conversion efficiency and $H_2$ generating activities due to water gas shift reaction even after a high-temperature durability test.

The present inventive method of producing composite oxide powder can easily and securely produce the composite oxide powder of the present invention having the above excellent characteristics.

BRIEF DESCRIPTION OF THE DRAWINGS

Other objects and features of the invention will become apparent to those skilled in the art as the disclosure is made in the following description of preferred embodiments of the invention, as illustrated in the accompanying sheets of drawings, in which.

DETAILED DESCRIPTION OF THE PREFERRED EMBODIMENTS

Hereinafter, the present invention will be described in detail by way of examples and comparative examples.

EXAMPLE 1

An aqueous cerium nitrate solution produced by dissolving commercially available cerium nitrate 6-hydrate in deionized water was mixed with an aqueous aluminum nitrate solution produced by dissolving commercially available aluminum nitrate in deionized water at the molar ratio of Ce: Al=1:9 in terms of metal elements, thereby obtaining a water phase.

In the meanwhile, commercially available kerosene was used as an organic solvent and a dispersing agent ('SORGEN 90' produced by Dai-ichi Kogyo Seiyaku Co., Ltd. in Japan) was added to kerosene in an amount of 1 to 5% by weight, thereby obtaining an oil phase.

The water phase and the oil phase were mixed at the ratio of 40-70:60–30 (% by volume), and stirred by a homogenizer at 1000 to 20000 rpm for 5 to 30 minutes, thereby obtaining a W/O type emulsion. Optical microscopic observation showed that the diameter of each waterdrop in the above emulsion was about 1 to 2 μm.

Figure 1:
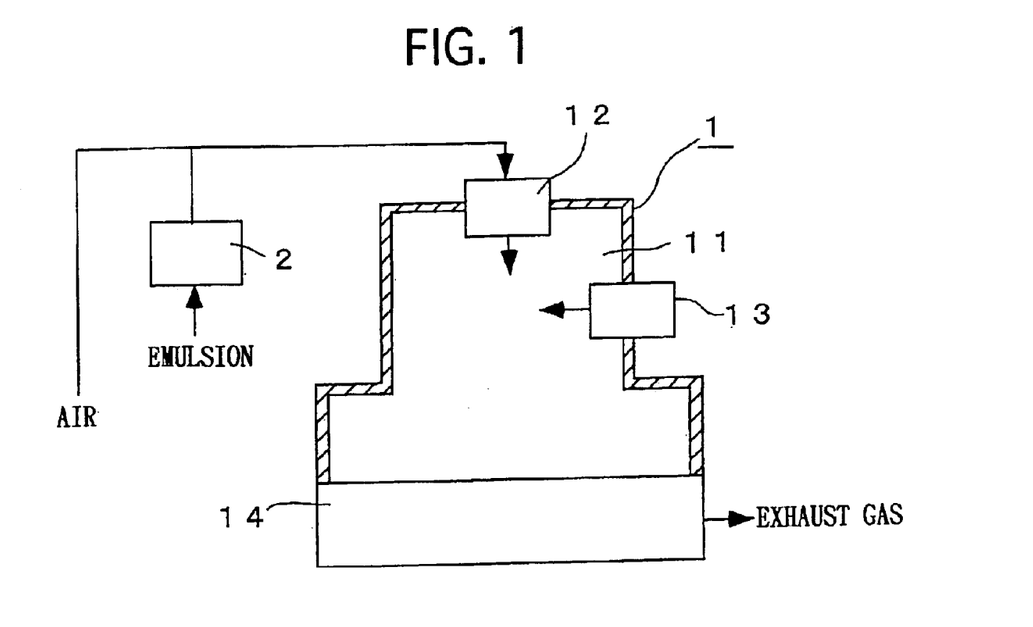
FIG. 1 is a schematic diagram of a production apparatus used for producing composite oxide powders according to examples of the present invention.

The W/O type emulsion thus produced was sprayed and burned by an apparatus shown in FIG. 1. This apparatus comprises a cylindrical reaction chamber 1, and a metering pump 2, which supplies the emulsion to the reaction chamber 1. The reaction chamber 1 comprises a reaction passage 11, an atomizer 12 for spraying the emulsion to the reaction passage 11, a burner 13 for heating the sprayed emulsion, and a powder collector 14 for collecting obtained oxide powder.

The atomizer 12, which is supplied with an air and the emulsion from the metering pump 2, sprays the emulsion and supplies the air to the reaction passage 11. The sprayed emulsion is ignited by the burner 13 to be burned, thereby obtaining oxide powder. The obtained powder is collected by the powder collecter 14, which is positioned below the reaction chamber 1. A combustion exhaust gas is emitted through the powder collecter 14 to the the outside of the reaction chamber 1.

The above W/O type emulsion was sprayed and burned by using this apparatus, thereby burning the oil phase and forming composite oxide powder. This synthesis was carried out by controlling the emulsion spray flow rate and the air flow rate so that the sprayed emulsion should be burned completely and flame center should have a temperature of about 800° C.

194 g of the obtained composite oxide powder, 21 g of aluminum nitrate 9-hydrate, 3.6 g of pseudo-boehmite and 400 g of pure water were pulverized in a wet manner into a median diameter D50 of about 7 μm, thereby obtaining a slurry. This slurry was coated on a cordierite honeycomb-shaped substrate (400 cells/inch, 3 mill) and the coated substrate was dried at 110° C. with the air introduced and then calcined at 600° C. for one hour, thereby fixing the coating layer. The coating process was repeated if required and 200 g of the coating layer was formed per liter of the honeycomb substrate. Next, Pt and Rh were loaded by impregnation by using an aqueous dinitrodiammine platinum solution and an aqueous rhodium nitrate solution and calcined at a predetermined temperature, thereby preparing a catalyst. 1.5 g of Pt and 0.3 g of Rh were loaded per liter of the honeycomb substrate.

EXAMPLE 2

Composite oxide powder was produced in a similar way to Example 1, except that the molar ratio of Ce: Al=2:8.

A catalyst was produced in a similar way to Example 1, by using a similar slurry to that of Example 1 except that 143 g of the obtained composite oxide powder, 21 g of aluminum nitrate 9-hydrate, 3.6 g of pseudo-boehmite, and 51 g of stabilized $Al_2O_3$ were mixed.

EXAMPLE 3

Composite oxide powder was produced in a similar way to Example 1, except that the molar ratio of Ce: Al=3:7.

A catalyst was produced in a similar way to Example 1, by using a similar slurry to that of Example 1 except that 111 g of the obtained composite oxide powder, 21 g of aluminum nitrate 9-hydrate, 3.6 g of pseudo-boehmite, and 83 g of stabilized $Al_2O_3$ were mixed.

EXAMPLE 4

Composite oxide powder was produced in a similar way to Example 1, except that the molar ratio of Ce: Al=5:5.

A catalyst was produced in a similar way to Example 1, by using a similar slurry to that of Example 1 except that 85 g of the obtained composite oxide powder, 21 g of aluminum nitrate 9-hydrate, 3.6 g of pseudo-boehmite, and 109 g of stabilized $Al_2O_3$ were mixed.

EXAMPLE 5

Composite oxide powder was produced in a similar way to Example 1 except that the molar ratio of Ce: Al=7:3.

A catalyst was produced in a similar way to Example 1, by using a similar slurry to that of Example 1 except that 74 g of the obtained composite oxide powder, 21 g of aluminum nitrate 9-hydrate, 3.6 g of pseudo-boehmite, and 120 g of stabilized $Al_2O_3$ were mixed.

EXAMPLE 6

Composite oxide powder was produced in a similar way to Example 1 except that the molar ratio of Ce: Al=8:2.

A catalyst was produced in a similar way to Example 1, by using a similar slurry to that of Example 1 except that 70 g of the obtained composite oxide powder, 21 g of aluminum nitrate 9-hydrate, 3.6 g of pseudo-boehmite and 124 g of stabilized $Al_2O_3$ were mixed.

EXAMPLE 7

Composite oxide powder was produced in a similar way to Example 1 except that praseodymium nitrate was used instead of cerium nitrate and that the molar ratio of Pr: Al=2:8.

A catalyst was produced in a similar way to Example 1, by using a similar slurry to that of Example 1 except that 140 g of the obtained composite oxide powder, 21 g of aluminum nitrate 9-hydrate, 3.6 g of pseudo-boehmite and 54 g of stabilized $Al_2O_3$ were mixed.

EXAMPLE 8

Composite oxide powder was produced in a similar way to Example 1 except that terbium nitrate was used instead of cerium nitrate and that the molar ratio of Tb: Al=2:8.

A catalyst was produced in a similar way to Example 1, by using a similar slurry to that of Example 1 except that 124 g of the obtained composite oxide powder, 21 g of aluminum nitrate 9-hydrate, 3.6 g of pseudo-boehmite and 70 g of stabilized $Al_2O_3$ were mixed.

EXAMPLE 9

Composite oxide powder was produced in a similar way to Example 1 except that lanthanum nitrate was added and that the molar ratio of Ce: Al: La=2:8:0.02.

A catalyst was produced in a similar way to Example 1, by using a similar slurry to that of Example 1 except that 144 g of the obtained composite oxide powder, 21 g of aluminum nitrate 9-hydrate, 3.6 g of pseudo-boehmite and 50 g of stabilized $Al_2O_3$ were mixed.

EXAMPLE 10

Composite oxide powder was produced in a similar way to Example 1 except that yttrium nitrate was added and that the molar ratio of Ce: Al: Y=2:8:0.02.

A catalyst was produced in a similar way to Example 1, by using a similar slurry to that of Example 1 except that 144 g of the obtained composite oxide powder, 21 g of aluminum nitrate 9-hydrate, 3.6 g of pseudo-boehmite and 50 g of stabilized $Al_2O_3$ were mixed.

EXAMPLE 11

Composite oxide powder was produced in a similar way to Example 1 except that zirconium nitrate was added and that the molar ratio of Ce: Al :Zr=2:8:0.02.

A catalyst was produced in a similar way to Example 1, by using a similar slurry to that of Example 1 except that 144 g of the obtained composite oxide powder, 21 g of aluminum nitrate 9-hydrate, 3.6 g of pseudo-boehmite and 50 g of stabilized $Al_2O_3$ were mixed.

EXAMPLE 12

Composite oxide powder was produced in a similar way to Example 1 except that titanium tetrachloride was used instead of aluminum nitrate and that the molar ratio of Ce:Ti=2:8.

A catalyst was produced in a similar way to Example 1 by using the obtained composite oxide powder.

COMPARATIVE EXAMPLE 1

A catalyst was produced in a similar way to Example 1, by using a slurry composed of 65 g of commercially available $CeO_2$ powder with a specific surface area of 70 $m^2/g$ and an initial $CeO_2$ crystallite diameter of 9 nm, 129 g of stabilized $Al_2O_3$, 21 g of aluminum nitrate 9-hydrate, 3.6 g of pseudo-boehmite and 250 g of pure water.

<Experiment and Evaluation>

Table 1 shows the composition of the obtained composite oxide powders and Table 4 shows the composition of the obtained catalysts in the respective examples and Comparative Example 1.

The obtained composite oxide powders of Examples 1, 2 and 4 were subjected to thermal treatments at 600, 800 and 1000° C. for 4 hours, respectively in the air and were measured on the specific surface area by the BET method. The results are shown in FIG. 2.

Figure 2:
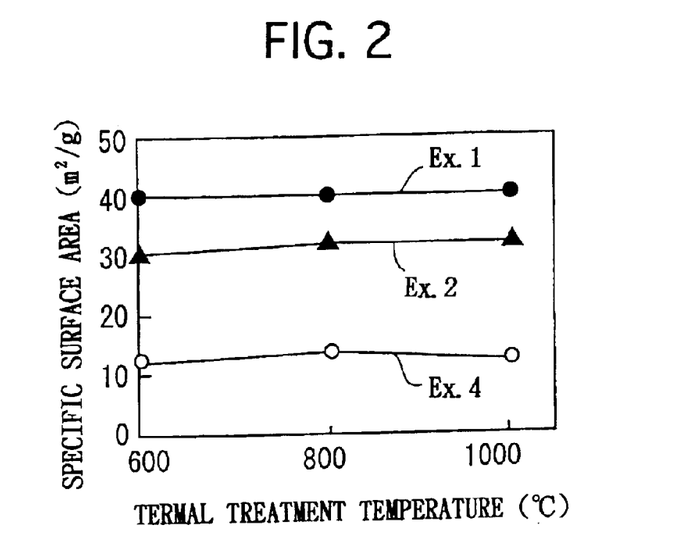
FIG. 2 is a graph showing the relationship between thermal treatment temperature and specific surface area of composite oxide powders of examples of the present invention.

It is apparent from FIG. 2 that the specific surface area did not vary in spite of thermal treatment temperature, and that the composite oxide powders of the respective examples are excellent in heat resistance.

Figure 3:
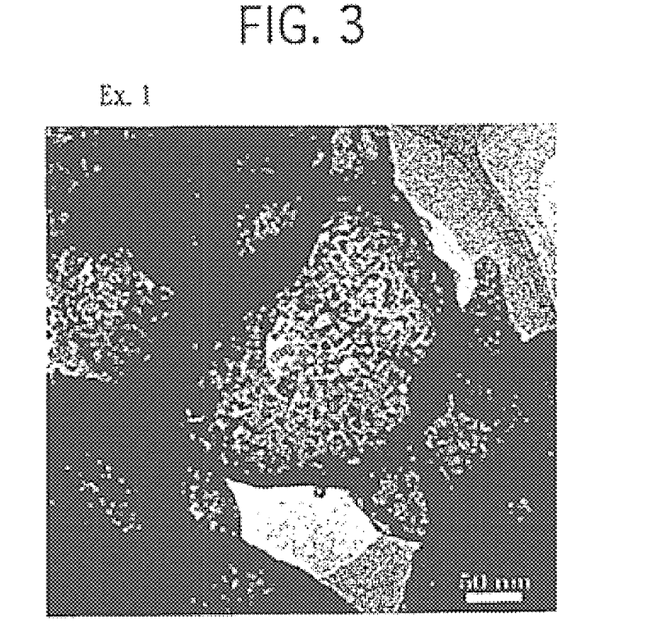
FIG. 3 is a TEM photograph showing particle structure of composite oxide powder of Example 1.
Figure 4:
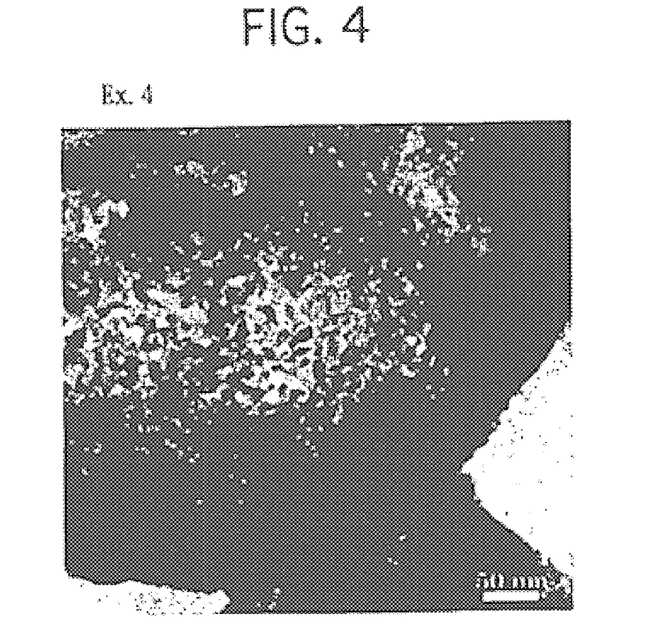
FIG. 4 is a TEM photograph showing particle structure of composite oxide powder of Example 4.
Figure 5:
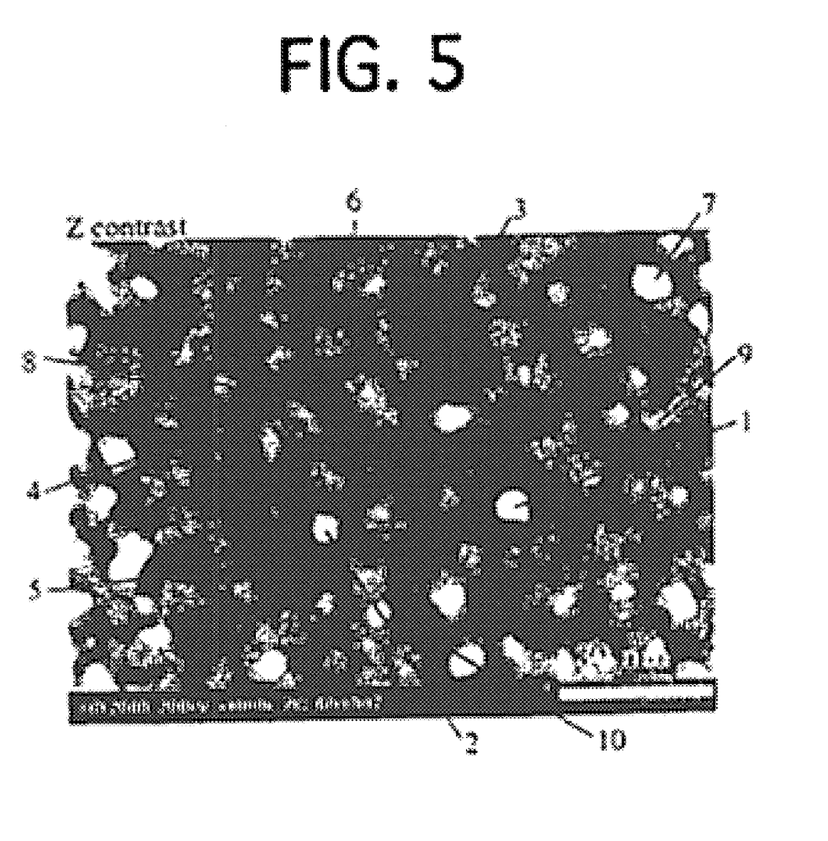
FIG. 5 is a TEM photograph showing particle structure of composite oxide powder of Example 1 after thermal treatment.

Transmission electron microscopic photographs of the composite oxide powders of Examples 1 and 4 are respectively shown in FIGS. 3 and 4, and a TEM photograph of the composite oxide powder of Example 1 after subjected to a thermal treatment at 1000° C. for 4 hours is shown in FIG. 5. In FIG. 5, white particles designate $CeO_2$ and black particles designate $Al_2O_3$. FIGS. 3 and 4 show that the composite oxide powders of the examples has a hollow shape. It was confirmed that the composite oxide powders of the other examples also have a hollow shape.

As clear from FIG. 5, the composite oxide particles of Example 1 are a composite of $Al_2O_3$ and $CeO_2$, and the $CeO_2$ particles and $Al_2O_3$ particles exist together in a shell of each hollow particle, and the $CeO_2$ particles exist independently with a particle diameter of not more than 10 nm and are exposed on the surface of the shell even after subjected to the thermal treatment of 1000° C.

Figure 6:
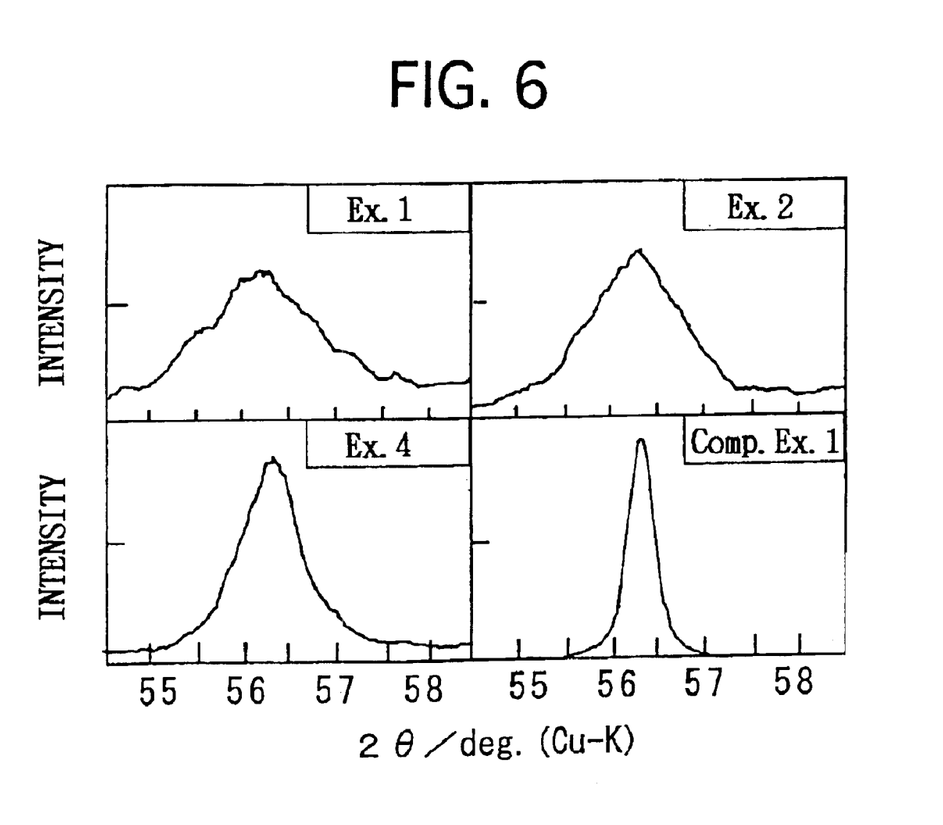
FIG. 6 is a XRD profile of $CeO_2$ (311) in composite oxide powder of the examples and a comparative example.

FIG. 6 shows XRD profiles of $CeO_2$ (311) of the composite oxide powders of Examples 1, 2 and 4 and the $CeO_2$ powder of Comparative Example 1 after subjected to thermal treatment at 1000° C. for 4 hours. The composite oxide powder of each example had an obtuser peak and a smaller $CeO_2$ particle diameter than the $CeO_2$ powder of comparative Example 1. Since the compositional ratio of $Al_2O_3$ is larger, the peak is obtuser. This verifies that as the amount of $Al_2O_3$ is higher, $CeO_2$ grain growth is more suppressed. Although not shown in the drawing, it was verified that in the composite oxide particles of Examples 9 to 11 containing $La_2O_3$, $Y_2O_3$ or $ZrO_2$, $CeO_2$ grain growth is more suppressed than in Example 2.

Next, energy dispersive X-ray analysis and X-ray diffraction particle diameter measurement of the first metal oxide were carried out on the composite oxide powders of the respective examples and the $CeO_2$ powder of Comparative Example 1 after subjected to a thermal treatment at 1000° C. for 4 hours in the air. The results are shown in Table 1.

TABLE 1

| | COMPOSITION | MOLAR RATIO | PORE VOLUME (cc/g) | SIZE* (nm) |
|---|---|---|---|---|
| Ex. 1 | $CeO_2$—$Al_2O_3$ | Ce:Al = 1:9 | 3.2 | 8 |
| Ex. 2 | $CeO_2$—$Al_2O_3$ | Ce:Al = 2:8 | 2.9 | 12 |
| Ex. 3 | $CeO_2$—$Al_2O_3$ | Ce:Al = 3:7 | 2.7 | 15 |
| Ex. 4 | $CeO_2$—$Al_2O_3$ | Ce:Al = 5:5 | 2.3 | 25 |
| Ex. 5 | $CeO_2$—$Al_2O_3$ | Ce:Al = 7:3 | 2.2 | 27 |
| Ex. 6 | $CeO_2$—$Al_2O_3$ | Ce:Al = 8:2 | 2.1 | 28 |
| Ex. 7 | $Pr_2O_3$—$Al_2O_3$ | Pr:Al = 2:8 | 2.8 | 12 |
| Ex. 8 | $Tb_2O_3$—$Al_2O_3$ | Tb:Al = 2:8 | 3.1 | 11 |
| Ex. 9 | $CeO_2$—$Al_2O_3$—$La_2O_3$ | Ce:Al:La = 2:8:0.02 | 3.0 | 8 |
| Ex. 10 | $CeO_2$—$Al_2O_3$—$Y_2O_3$ | Ce:Al:Y = 2:8:0.02 | 2.9 | 9 |
| Ex. 11 | $CeO_2$—$Al_2O_3$—$ZrO_2$ | Ce:Al:Zr = 2:8:0.02 | 2.7 | 6 |
| Ex. 12 | $CeO_2$—$TiO_2$ | Ce:Ti = 2:8 | 2.1 | 15 |
| Com. Ex. 1 | $CeO_2$ | — | 0.3 | 37 |

*denotes the diameter of the first metal oxide particles after the durability test.

Table 1 clearly shows that the composite oxide powders of the respective examples have a first metal oxide particle diameter of not more than 30 nm even after subjected to the thermal treatment at 1000° C. for 4 hours and that sintering was more suppressed than in Comparative Example 1. It is also clear from Table 1 that sintering was more suppressed by the inclusion of the third metal oxide.

Next, the respective catalyst of the examples and the comparative example were cut into a test piece of 35 $cm^3$ and subjected to a durability test at 900° C. for 5 hours in a fuel-rich/fuel-lean variation atmosphere shown in Table 2. Then 50% conversion efficiencies of NO, CO and HC in a fuel-rich/fuel-lean variation atmosphere shown in Table 3 were measured about each catalyst. The total flow rate of the model gases were respectively 20 liter/minute. The results are shown in Table 4.

The coating layer was scratched off from each catalyst before the durability test, and pore volume of these powders were measured by a mercury pressure method.

TABLE 2

| | CO/H$_2$ (%) | CO$_2$ (%) | O$_2$ (%) | H$_2$O (%) | N$_2$ | VARIATION TIME (second) |
|---|---|---|---|---|---|---|
| FUEL-RICH GAS | 1 | 3 | 0 | 3 | balance | 10 |
| FUEL-LEAN GAS | 1 | 3 | 4 | 3 | balance | 10 |

TABLE 3

| | C$_3$H$_8$ (% C) | CO (%) | NO (ppm) | CO$_2$ (%) | O$_2$ (%) | H$_2$O (%) | N2 | VARIATION TIME (second) |
|---|---|---|---|---|---|---|---|---|
| FUEL-RICH GAS | 0.1 | 3 | 0.16 | 3 | 0.325 | 3 | balance | 1 |
| FUEL-LEAN GAS | 0.1 | 3 | 0.16 | 3 | 1.325 | 3 | balance | 1 |

TABLE 4

| | COMPOSITE OXIDE COMPOSITION | STABLE Al$_2$O$_3$ (g) | 1 M OXIDE (mol)* | Pt/Rh (g/L) | 50% CONVERSION TEMPERATURE (° C.) | | |
|---|---|---|---|---|---|---|---|
| | | | | | NO | CO | HC |
| Ex. 1 | CeO$_2$-Al$_2$O$_3$ | 194 | 0 | 0.32 | 1.5/0.3 | 200 | 192 | 203 |
| Ex. 2 | CeO$_2$-Al$_2$O$_3$ | 143 | 51 | 0.38 | 1.5/0.3 | 194 | 191 | 198 |
| Ex. 3 | CeO$_2$-Al$_2$O$_3$ | 111 | 83 | 0.38 | 1.5/0.3 | 196 | 193 | 202 |
| Ex. 4 | CeO$_2$-Al$_2$O$_3$ | 85 | 109 | 0.38 | 1.5/0.3 | 200 | 195 | 209 |
| Ex. 5 | CeO$_2$-Al$_2$O$_3$ | 74 | 120 | 0.38 | 1.5/0.3 | 195 | 192 | 199 |
| Ex. 6 | CeO$_2$-Al$_2$O$_3$ | 70 | 124 | 0.38 | 1.5/0.3 | 201 | 195 | 205 |
| Ex. 7 | Pr$_2$O$_3$-Al$_2$O$_3$ | 140 | 54 | 0.19 | 1.5/0.3 | 201 | 194 | 205 |
| Ex. 8 | Tb$_2$O$_3$-Al$_2$O$_3$ | 124 | 70 | 0.19 | 1.5/0.3 | 200 | 195 | 204 |
| Ex. 9 | CeO$_2$-Al$_2$O$_3$-La$_2$O$_3$ | 144 | 50 | 0.38 | 1.5/0.3 | 192 | 190 | 196 |
| Ex. 10 | CeO$_2$-Al$_2$O$_3$-Y$_2$O$_3$ | 144 | 50 | 0.38 | 1.5/0.3 | 193 | 190 | 197 |
| Ex. 11 | CeO$_2$-Al$_2$O$_3$-ZrO$_2$ | 144 | 50 | 0.38 | 1.5/0.3 | 192 | 190 | 196 |
| Ex. 12 | CeO$_2$-TiO$_2$ | 194 | 0 | 0.38 | 1.5/0.3 | 198 | 195 | 205 |
| Comp. Ex. 1 | CeO$_2$ | 65 | 129 | 0.38 | 1.5/0.3 | 210 | 208 | 220 |

*denotes the molar ratio of the first metal oxide in the catalyst support.

It is clear that the catalyst support powders of the catalysts of the respective examples have a pore volume of not less than 2 cc/g, which are quite larger than that of Comparative Example 1. Since the pore volume of stabilized Al$_2$O$_3$ and pseudo-boehmite contained in the coating layer is 1 cc/g, the large pore volume of not less than 2 cc/g is clearly owing to the composite oxide powder.

It is also clear from Table 4 that the catalysts of the respective examples had improved catalytic activities after the durability test than that of Comparative Example 1. Comparison between Examples 1 to 6 demonstrate that the compositional ratio of the first metal oxide and the second metal oxide had an optimal value. As evidenced by the fact that the catalysts of Examples 9 to 11 had particularly high catalytic activities and small CeO$_2$ particle diameters, the addition of the third metal oxide further improved thermal stability.

Having now fully described the present invention, it will be apparent to one of ordinary skill in the art that many changes and modifications can be made thereto without departing from the spirit or scope of the present invention as set forth herein including the appended claims.

What is claimed is:

1. Composite oxide powder, containing a first metal oxide having oxygen storage ability and a second metal oxide which is different from said first metal oxide, wherein:
   said first metal oxide is held as ultrafine particles in the form of islands by said second metal oxide;
   said composite oxide powder has a pore volume of not less than 2 cc/g; and
   said first metal oxide has a particle diameter of not more than 30 nm even after being exposed to high temperature of 900° C. or more.

2. The composite oxide powder according to claim 1, wherein said first metal oxide is at least one member selected from the group consisting of CeO$_2$, Pr$_2$O$_3$, EU$_2$O$_3$ and Tb$_2$O$_3$.

3. The composite oxide powder according to claim 1, wherein said second metal oxide is at least one member selected from the group consisting of Al$_2$O$_3$, SiO$_2$, TiO$_2$, SiO$_2$—Al$_2$O$_3$ and TiO$_2$—Al$_2$O$_3$.

4. The composite oxide powder according to claim 3, wherein said second metal oxide includes Al$_2$O$_3$.

5. The composite oxide powder according to claim 1, wherein the compositional molar ratio of said first metal oxide to said second metal oxide is desirably in the range of first metal element: second metal element=8:2 to 0.5:9.5.

6. The composite oxide powder according to claim 1, wherein said composite oxide powder further contains a third metal oxide which is at least one member selected from the group consisting of La$_2$O$_3$, Y$_2$O$_3$ and ZrO$_2$.

7. The composite oxide powder according to claim 1, wherein said composite oxide powder has a shell shape.

8. The composite oxide powder according to claim 7, wherein said shell shape is hollow.

9. The composite oxide powder according to claim 7, wherein said particles of said first metal oxide are exposed on the surface of a shell composed of said second metal oxide or said second metal oxide and said third metal oxide.

10. The composite oxide powder according to claim 8, wherein said composite oxide powder has an outside particle diameter of 20 to 5000 nm.

11. The composite oxide powder according to claim 8, wherein the ratio of an inner hole diameter to an outside particle diameter is 0.5 to 0.99.

12. The composite oxide powder according to claim 8, wherein said composite oxide powder has a specific surface area of 20 m$^2$/g or more.

13. A catalyst comprising:

a catalyst support composed of said composite oxide powder according to claim 1; and a catalyst metal loaded on said catalyst support.

14. A process for producing composite oxide powder of claim 1, comprising the steps of:

preparing a W/O type emulsion by mixing an organic solvent and a dispersing agent in an aqueous solution in which a water-soluble compound of a first metal element whose oxide has oxygen storage ability and a water-soluble compound of a second metal element which is different from said first metal element are dissolved; and spraying and burning said W/O type emulsion, thereby obtaining composite oxide powder.

15. The process for producing composite oxide powder according to claim 14, wherein burning temperature is in the range from 600 to 1200° C.

16. The process for producing composite oxide powder according to claim 14, wherein after said spraying and burning, a thermal treatment is applied to said obtained composite oxide powder at 700 to 1200° C.

17. The process for producing composite oxide powder according to claim 14, wherein said first metal element is at least one member selected from the group consisting of Ce, Pr, Eu and Tb.

18. The process for producing composite oxide powder according to claim 14, wherein said second metal element is at least one member selected from the group consisting of Al, Si and Ti.

19. The process for producing composite oxide powder according to claim 14, wherein said aqueous solution further contains a third metal element which is at least one member selected from the group consisting of La, Y and Zr.

20. The process for producing composite oxide powder according to claim 14, wherein a catalyst metal compound is further dissolved in said aqueous solution.

21. The process for producing composite oxide powder according to claim 14, wherein the waterdrop diameter in said emulsion is desirably controlled in the range of 100 nm to 10 $\mu$m.

22. The process for producing composite oxide powder according to claim 14, wherein water is desirably 70% by volume or less.

* * * * *